United States Patent Office 2,890,153
Patented June 9, 1959

2,890,153

PREPARATION OF $\Delta^{1,4}$ STEROID COMPOUNDS BY MICROMONOSPORA

Gilbert M. Shull, Huntington Station, N.Y., assignor to Chas. Pfizer & Co., Brooklyn, N.Y., a corporation of Delaware No Drawing. Application February 12, 1957
Serial No. 639,635

12 Claims. (Cl. 195—51)

This invention is concerned with the oxidation of certain steroid compounds by microbiological means. More particularly, it is concerned with the dehydrogenation of certain 3-keto-nuclear-saturated steroid compounds by means of microorganisms of the genus Micromonospora or oxidizing enzymes produced by these microorganisms. This application is in part a continuation of the copending application, Serial No. 580,703, filed April 26, 1956, now U.S. Patent 2,809,919.

It has now unexpectedly been discovered that 3-keto $\Delta^{1,4}$ steroid compounds may be produced from the corresponding 3-keto-nuclear saturated steroids by contacting the latter with the oxidizing activity produced by microorganisms of the species *Micromonospora chalcea*. In addition the $\Delta^4$-double bond alone may be introduced in the nucleus, or mixtures of this and the $\Delta^{1,4}$-product, depending on the conditions employed, the reaction time and so forth. This reaction is of very great value because many $\Delta^{1,4}$-steroids, for instance the compounds $\Delta^{1,4}$-pregnadiene-11$\beta$,17$\alpha$,21 - triol-3,20 - dione (prednisolone), $\Delta^{1,4}$-pregnadiene-17$\alpha$,21-diol-3,11,20-trione (prednisone), 14-hydroxy-prednisolone, 14-hydroxy-prednisone, etc., are of great value in the treatment of certain diseases of the human body, particularly rheumatoid arthritis. There are many readily available nuclear saturated steroids which could be relatively cheap starting materials for the synthesis of these compounds, but no practicable method has heretofore been known to introduce the requisite double bonds in the A ring. A process whereby $\Delta^1$ and $\Delta^4$ double bonds may be introduced in the A ring is, therefore, of great value to the pharmaceutical industry and to the public welfare.

It has been reported that a double bond at the one-position may be introduced into certain 3-keto $\Delta^4$- compounds by means of organisms different from the organisms employed in this invention. An extremely large number of organisms have been tested for their ability to carry out this reaction and have been found unable to do so. It has also been discovered that organisms of the species *Micromonospora chalcea* carry out this reaction in high yield.

Additional advantages of the organisms of the particular species *Micromonospora chalcea* lie in the fact that the products obtained are relatively free of by-products and are consequently readily purified. Since the purification step is a costly one, this freedom from by-products is a very important advantage. A still further advantage of *Micromonospora chalcea* is that the organism is relatively fast growing and may easily be grown on inexpensive nutrient media.

The process of this invention, i.e. the contacting of a suitable steroid compound with the oxidizing activity of *Micromonospora chalcea*, may be carried out by bringing the chosen steroid compound in aqueous solution or suspension into contact with either an actively growing culture of *Micromonospora chalcea*, with cells of *Micromonospora chalcea* removed from the growing culture and suspended in a suitable medium, or by contacting the steroid with extracts of oxidizing enzymes obtained from the culture of *Micromonospora chalcea*.

An object of this invention is a process for the preparation of oxidized steroids, particularly 3-keto-$\Delta^{1,4}$- steroids, 3-keto-$\Delta^4$-steroids, and mixtures thereof, from the corresponding 3-keto-nuclear-saturated compounds. A further object of this invention is an economical process for this dehydrogenation reaction which may be readily scaled up for large volume production. Further objects of this invention will be apparent from the following discussion.

A variety of 3-keto-nuclear-saturated steroid compounds may be used as starting materials for the reaction of this invention. These include such materials as:

Androstane-3-one
Androstane-3,17-dione
Bisnorcholane-3-one
Pregnane-3-one
Pregnane-3,20-dione
4-dihydrocorticosterone
17$\alpha$-hydroxyandrostane-3-one
Estrane-3-one
4-dihydrodesoxycorticosterone
Allopregnane-3-one
Allopregnane-3,20-dione
17$\alpha$-hydroxypregnane-3-one and 3,20-dione
11$\beta$-hydroxypregnane-3-one and 3,20-dione
20-hydroxypregnane-3-one
14$\alpha$-hydroxypregnane-3-one and 3,20-dione
Pregnane- and allopregnane-3,11-dione and 3,11,20-trione
11$\beta$,17$\alpha$,21-trihydroxypregnane-3,20-dione
17$\alpha$,21-dihydroxypregnane-3,11,20-trione
11$\beta$,21-dihydroxypregnane-3,20-dione
11$\beta$,14$\alpha$,17$\alpha$,21-tetrahydroxypregnane-3,20-dione
21-hydroxypregnane-3,20-dione In general this process is most applicable to 3-keto-nuclear saturated steroid reactants having from 18 to 21 atoms in the carbon skeleton. The products of the reaction may be detected by careful comparison of paper chromatograms of the products formed with known steroid compounds. This method has been tested on a variety of compounds and is known to give reliable results. Reports of this method are available in the chemical literature.

The organism *Micromonospora chalcea* is described on page 127 of Actinomycetes and Their Antibiotics, Waksman and Lechevalier, 1953, Williams and Wilkens, Baltimore. The organism listed in the catalog of the American Type Culture Collection as Micromonospora species 10,026 has been obtained from that public culture collection and has been identified as belonging to the species *Micromonospora chalcea*. A living culture of an organism isolated from the soil and classified as being of the species *Micromonospora chalcea* has been deposited with the American Type Culture Collection, Washington, D.C., and given the number ATCC 12,452. Both *Micromonospora chalcea* ATCC 12,452 and Micromonospora species 10,026 conform to the description of the species *Micromonospora chalcea* given on page 127 in the authoritative text by Waksman and Lechevalier above. The organism isolated from the soil and also the organism obtained from the American Type Culture Collection carry out the reactions of this invention.

There are several procedures which may be used in the new dehydrogenation process. In the first of these, nutrient media are seeded from slants of *Micromonospora chalcea*. Such a medium may consist, for instance, of a mixture of a standard bacteriological nutrient broth base, together with added carbohydrate. The seeded, sterile, nutrient solutions may be grown in shake flasks for two to three days to provide inoculum for larger vessels, and in turn, the larger, stirred, aerated vessels may be used for the inoculation of full production-scale vessels for submerged fermentation. The same medium of the type described above may be used for the large-scale oxidation of steroids according to this invention. Considerable variation may, of course, be made in the medium. In general there is required a carbohydrate, a source of organic nitrogen, mineral salts and various trace metals.

As pointed out above, rather than conducting the oxidation of the selected steroid compound in the presence of thes whole fermentation product, cells may be removed from growing cultures and these may be resuspended in a medium which has been designated the enzyme reaction mixture. Such a reaction mixture may consist, for instance, of a solution which is 0.01 molar in sodium fumarate or other hydrogen acceptor and in magnesium sulfate and 0.03 molar in sodium citrate. It has been found that the presence of a certain amount of adenosine triphosphate, e.g. 0.125%, is also quite useful. Centrifuged, washed cells of *Micromonospora chalcea* may be suspended in this type of reaction mixture, which is adjusted to a pH of about 6, for example with citric acid. After addition of the steroid compound which it is desider to oxidize, the mixture may be incubated at about 37° C., and samples may be removed from time to time to determine the point at which maximum conversion of the steroid has taken place. In general, this occurs after about one to several days. I have found that the cells from about 100 milliliters of the stirred, aerated *Micromonospora chalcea* cultures may be suspended in about 20 milliliters of an enzyme mixture for suitable results. Considerable variation may be made in these proportions. The steroid compound may be used in a proportion of about 25 to about 200 milligrams/100 milliliters of the enzyme reaction mixture. The compound in solid form is merely added to the medium after adjustment of the pH. The flasks are stoppered with cotton so that they are exposed to the air during the incubation. I prefer to use a small volume compared to the volume of flask, for instance, 20 milliliters in a 125-milliliter Erlenmeyer flask. Alternatively, the mixture may be stirred and aerated. In general, at least a hydrogen acceptor, a divalent metal particularly magnesium, and buffer are required in the medium.

Rather than removing the *Micromonospora chalcea* cells and carrying out the reaction of this invention in an enzyme reaction mixture, the steroid compound may be added directly to a sterilized portion of nutrient medium, such as is described above, and the medium is then seeded with *Micromonospora chalcea*. Approximately the same proportion of chosen steroid compound may be used in this case also. Samples of the agitated, aerated mixture may be removed at intervals for determination of the conversion of the steroid compound to the oxidized products. The mixture is maintained at between 20°–37° C. or higher during the growth of the cells and the conversion of the steroid. In general, about ½ to seven days are required for maximum production of the oxidized compounds. Alternatively, the growth of the cells may be established before addition of the steroid.

A third method which is also very useful for the oxidation of the selected steroid compounds involves the use of oxidizing enzymes produced by *Micromonospora chalcea*. These may be prepared by a variety of methods from the cells of the chosen organisms. These materials may be released from the cells by several different procedures. These include grinding, particularly with abrasive materials such as powdered glass or sand, which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° to about 50° C. The cells disintegrate within one to several days and the cell residue may be removed by filtration, for instance through a Seitz filter or through a sintered glass bacterial filter. A third method for preparing cell-free elaboration products of *Micromonospora chalcea* useful for the reactions of this invention is by repeated, rapid freezing and thawing of the cellular material. Another method is by the use of ultrasonic energy to rupture the cells. One further method of use for the same purpose is by the use of a water-miscible solvent and, in particular, acetone. The cells, when placed in such a solvent are ruptured and an extract of the desired enzymes is obtained. The *Micromonospora chalcea* enzymes may be used for the oxidation of the 3-keto-saturated steroid compounds in media similar to those used with the grown cells, that is, one containing a hydrogen acceptor such as fumarate, a buffer and, in some cases, a bivalent metal, particularly magnesium, as well as a minor proportion of adenosine triphosphate. The cell-free oxidizing enzymes of *Micromonospora chalcea* may be used in media indicated above at a temperature of about 20° to about 40° C. In general, the oxidation of the desired steroid compounds is brought about in a period of from a few hours to several days. The optimum time and temperature and other conditions may readily be determined by a minimum of experimentation. Detailed descriptions of suitable media for both the use of isolated, resuspended cells and of cell-free elaboration products are given in the textbooks "Manometric Technique in Tissue Metabolism" by W. W. Umbreit et al., Burgess Publishing Company, Minneapolis (1949), and "Respiratory Enzymes" by H. Lardy, Burgess Publishing Company, Minneapolis (1949).

The reaction is conveniently followed by means of paper chromatography; numerous descriptions of the use of paper chromatography have been reported in the literature. The products of the new method described in this application may be isolated from aqueous solution by extraction with various water-immiscible organic solvents. Lower halogenated hydrocarbons, such as chloroform, are particularly useful. After extraction, the solvents may be removed by distillation and the solid product is then isolated. This material may be further purified by recrystallization procedures from organic solvents or by chromatography, for instance on alumina columns or on other suitable solid absorbent materials. The use of a silica gel-ethanol column with mixtures of methylene chloride and from 2 to 5% by volume of ethanol (95%) as a developer has been found particularly advantageous. Methods for the separation of products of this nature have been reported previously in the literature. For some uses the products need not be separated, but the crude mixture may be used as such. It has been found advantageous in some cases to acylate the crude products and work with the resulting esters which are somewhat more stable. As above noted, a variety of 3-keto-nuclear-saturated steriods are possible starting materials for the reactions of this invention. Furthermore, since the process may selectively introduce a $\Delta^4$-double bond, one may use a $\Delta^1$-unsaturated 3-keto-starting material, thereby also obtaining the desired $\Delta^{1,4}$-product. The various $\Delta^{1,4}$ and $\Delta^4$ products are useful as intermediates in the synthesis or other useful compounds. For example, the dehydrogenated products which contain unsaturation at the 1,2-position, along with the 3-keto group and the 4,5-unsaturation, are especially susceptible to Inhoffen aromatization. This gives rise to a group of derivatives of estrone.

In addition to the utility mentioned above, many of the compounds produced by this reaction are extremely valuable because of their biological activity. For example, when 11β,17α,21-trihydroxypregnane-3,20-dione is treated with *Micromonospora chalcea* according to the process of this present invention, the compound formed is prednisolone, which is of great utility and has advantages over hydrocortisone in the treatment of rheumatoid arthritis. When 17α,21-dihydroxypregnane-3,11,20-trione is treated with *Micromonospora chalcea,* there is produced the compound known as prednisone which also has great utility in the treatment of rheumatoid arthritis. It has also been found that other 3-keto-$\Delta^{1,4}$ steroids possess great activity as adrenocortical hormones and are useful for the same type of therapy as hydrocortisone. Many naturally occurring steroids, and steroids readily prepared from naturally occurring ones, have a 3-keto-nuclear-saturated structure, but no 3-keto-$\Delta^{1,4}$ compounds are readily available as raw materials. For this reason the process of this invention, whereby it is possible to dehydrogenate one or both of the A-ring bonds which is in conjugation with the 3-keto group of the saturated steroid nucleus in one single step in large-scale commercial production, is of tremendous value.

The following examples are given by way of illustration and are not to be considered as limitations of this invention, since many apparently widely different embodiments of the present invention may be made without departing from the spirit or scope hereof.

*Example I*

A series of Fernbach flasks, each containing 500 ml. of the following medium:

| | Grams |
|---|---|
| N–Z amine B (trademark—Cheffield Farms casein hydrolysate) | 10 |
| Dextrose hydrate | 10 |
| Yeast extract | 5 |
| Calcium carbonate | 1 |

Tap water to make one liter.

were prepared. The flasks were plugged with cotton, sterilized and then inoculated with a suspension of the spores and vegetative growth prepared from a slant culture of *Micromonospora chalcea* (ATCC 10,026). The flasks were shaken at 28° C. for four days at which time 50 mg. of 11β,17α,21-trihydroxypregnane-3,20-dione as a sterile solution in acetone was added to each flask. Shaking was continued for 3 days more. Each flask was then extracted 3 times with an equal volume of chloroform. The combined chloroform extracts were applied to a silica gel chromatography column which was eluted with mixtures of methylene chloride and ethanol. Prednisolone was recovered in this fashion.

*Example II*

An experiment was run as described above except that this time the organism employed was *Micromonospora chalcea* (ATCC No. 12,452). Prednisolone was recovered in the same fashion.

*Example III*

The procedure of Examples I and II was repeated using 17α,21-dihydroxypregnane-3,11,20-trione as the starting material. The product prednisone was recovered in each case.

*Example IV*

The procedure of Example I was repeated using 4-dihydrodesoxycorticosterone as the starting material. After one day of the three-day reaction period a sample was removed and tested. Desoxycorticosterone was thus recovered in admixture with some $\Delta^1$-dehydro-desoxycorticosterone. At the end of the three days of reaction the product was identified as mostly $\Delta^1$-dehydro-desoxycorticosterone with traces of desoxycorticosterone.

*Example V*

A series of experiments were run using the procedure described in the above Examples I and II, and using the following steroids:

Androstane-3-one
Androstane-3,17-dione
Bisnorcholane-3-one
Pregnane-3-one
Pregnane-3,20-dione
4-dihydrocorticosterone
17α-hydroxyandrostane-3-one
Estrane-3-one
Allopregnane-3-one
Allopregnane-3,20-dione
17α-hydroxypregnane-3-one and 3,20-dione
11β-hydroxypregnane-3-one and 3,20-dione
20-hydroxypregnane-3-one
14α-hydroxypregnane-3-one and 3,20-dione
Pregnane- and allopregnane-3,11-dione and 3,11,20-trione
11β,21-dihydroxypregnane-3,20-dione
11β,14α,17α,21-tetrahydroxypregnane-3,20-dione
21-hydroxypregnane-3,20-dione In each case the products were extracted from the reaction mixture after three to five days, and were subjected to evaluation by the paper chromatography method. In each case, it was found that the main product constituted the corresponding steroid wherein double bonds had been introduced at both the 1-position and the 4-position; while a minor product was the corresponding $\Delta^4$-monounsaturated compound.

What is claimed is:

1. A process for the preparation of a steroid compound selected from the group consisting of a 3-keto-$\Delta^{1,4}$-steroid, a 3-keto-$\Delta^4$-steroid, and mixtures thereof, which comprises contacting a 3-keto-nuclear saturated steroid having from 18 to 21 atoms in the carbon skeleton with the oxidizing enzymes of an organism of the species *Micromonospora chalcea.*

2. A process for the preparation of a 3-keto-$\Delta^{1,4}$-steroid compound which process comprises contacting a 3-keto-nuclear saturated steroid having from 18 to 21 atoms in the carbon skeleton with the oxidizing enzymes of an organism of the species *Micromonospora chalcea.*

3. A process for the preparation of a 3-keto-$\Delta^4$-steroid compound, which process comprises contacting a 3-keto-nuclear saturated steroid having from 18 to 21 atoms in the carbon skeleton with the oxidizing enzymes of an organism of the species *Micromonospora chalcea.*

4. A process according to claim 1 wherein the nuclear-saturated steroid compound is a 3-keto-androstane.

5. A process according to claim 1, wherein the nuclear saturated steroid compound is a 3-keto-pregnane.

6. A process according to claim 1 wherein the nuclear saturated steroid compound is a 3-keto-allopregnane.

7. A process according to claim 1 wherein the nuclear saturated steroid compound is a bisnor-cholane.

8. A process for the preparation of $\Delta^{1,4}$-pregnadien-11β,17α,21-triol-3,20-dione which comprises contacting 11β,17α,21-trihydroxypregnane-3,20-dione with the oxidizing enzymes of an organism of the species *Micromonospora chalcea.*

9. A process for the preparation of $\Delta^{1,4}$-pregnadien-17α,21-diol-3,11,20-trione which comprises contacting 17α,21-dihydroxypregnane-3,11,20-trione with the oxidizing enzymes of an organism of the species *Micromonospora chalcea*.

10. A process for the preparation of $\Delta^{1,4}$-pregnadien-11β,21-diol-3,20-dione which comprises contacting 11β,21-dihydroxypregnane-3,20-dione with the oxidizing enzymes of an organism of the species *Micromonospora chalcea*.

11. A process for the preparation of $\Delta^{1,4}$-pregnadien-11β,14α,17α,21-tetrol-3,20-dione which process comprises contacting 11β,14α,17α,21 - tetrahydroxypregnane - 3,20-dione with the oxidizing enzymes of an organism of the species *Micromonospora chalcea*.

12. A process for the preparation of $\Delta^{1,4}$-pregnadien-21-ol-3,20-dione which comprises contacting 21-hydroxypregnane-3,20-dione with the oxidizing enzymes of an organism of the species *Micromonospora chalcea*.

References Cited in the file of this patent

UNITED STATES PATENTS 2,809,919     Shull et al. _____ Oct. 15, 1957

OTHER REFERENCES

Wettstein, A.: Experientia, 11, 1955, pp. 465–479.
Eppstein et al.: Vitamins and Hormones, XIV, 1956, p. 402.